(12) United States Patent
Pan (10) Patent No.: US 10,015,312 B1
(45) Date of Patent: Jul. 3, 2018

(54) AUTOMATIC CONNECTION THROUGH A PASSWORD PROTECTED NETWORK CONNECTION

(71) Applicant: Sorenson IP Holdings, LLC, Salt Lake City, UT (US)

(72) Inventor: Jasper Pan, Draper, UT (US)

(73) Assignee: SORENSON IP HOLDINGS, LLC, Salt Lake City, UT (US)

( * ) Notice: Subject to any disclaimer, the term of this patent is extended or adjusted under 35 U.S.C. 154(b) by 0 days.

(21) Appl. No.: 15/610,284

(22) Filed: May 31, 2017

Related U.S. Application Data (63) Continuation of application No. 14/819,316, filed on Aug. 5, 2015, now Pat. No. 9,686,404.

(51) Int. Cl.
*H04M 3/42* (2006.01)
*H04M 1/247* (2006.01)
*H04W 48/18* (2009.01)
*H04W 12/08* (2009.01)

(52) U.S. Cl.
CPC ..... *H04M 3/42391* (2013.01); *H04M 1/2475* (2013.01); *H04W 12/08* (2013.01); *H04W 48/18* (2013.01)

(58) Field of Classification Search
CPC ......... H04M 3/42391; H04M 2201/40; H04M 11/066; H04M 2201/60; H04M 1/2475; H04M 1/271; H04M 1/72519; H04M 11/08; H04M 2250/74; H04M 11/10; H04M 3/42382; H04M 1/2473; H04M 1/2535; H04M 2201/14

USPC ..................................................... 455/414.1
See application file for complete search history.

(56) References Cited

U.S. PATENT DOCUMENTS

| | | |
|---|---|---|
| 5,909,482 A | 6/1999 | Engelke |
| 5,974,116 A | 10/1999 | Engelke et al. |
| 5,978,654 A | 11/1999 | Colwell et al. |
| 6,075,841 A | 6/2000 | Engelke et al. |
| 6,075,842 A | 6/2000 | Engelke et al. |
| 6,233,314 B1 | 5/2001 | Engelke |
| 6,307,921 B1 | 10/2001 | Engelke et al. |
| 6,493,426 B2 | 12/2002 | Engelke et al. |
| 6,504,910 B1 | 1/2003 | Engelke et al. |
| 6,510,206 B2 | 1/2003 | Engelke et al. |
| 6,549,611 B2 | 4/2003 | Engelke et al. |
| 6,567,503 B2 | 5/2003 | Engelke et al. |
| 6,594,346 B2 | 7/2003 | Engelke |
| 6,603,835 B2 | 8/2003 | Engelke et al. |
| 6,748,053 B2 | 6/2004 | Engelke et al. |
| 6,882,707 B2 | 4/2005 | Engelke et al. |
| 6,885,731 B2 | 4/2005 | Engelke et al. |

(Continued)

*Primary Examiner* — Timothy Pham
(74) *Attorney, Agent, or Firm* — Maschoff Brennan (57) ABSTRACT

Communication devices and network devices may be configured to automatically connect to each other over a password protected network connection without a user setting the password for the password protected network connection. The communication devices may communicate over the password protected network connection to the network device and further to a communication service for providing interpretive services for hearing-impaired users, such as text captions, during a call. Predetermined network names and associated passwords may be persistent prior to set up as well as after a hard reset in which other user defined settings may be erased.

18 Claims, 5 Drawing Sheets

(56) References Cited

U.S. PATENT DOCUMENTS

| | | |
|---|---|---|
| 6,934,366 B2 | 8/2005 | Engelke et al. |
| 7,003,082 B2 | 2/2006 | Engelke et al. |
| 7,006,604 B2 | 2/2006 | Engelke |
| 7,113,581 B2 | 9/2006 | Benedyk et al. |
| 7,164,753 B2 | 1/2007 | Engelke et al. |
| 7,319,740 B2 | 1/2008 | Engelke et al. |
| 7,555,104 B2 | 6/2009 | Engelke |
| 7,660,398 B2 | 2/2010 | Engelke et al. |
| 7,881,441 B2 | 2/2011 | Engelke et al. |
| 8,213,578 B2 | 7/2012 | Engelke et al. |
| 8,379,801 B2 | 2/2013 | Romriell et al. |
| 8,416,925 B2 | 4/2013 | Engelke et al. |
| 8,588,413 B1 | 11/2013 | Kalbag et al. |
| 8,649,297 B2 | 2/2014 | Ahlers et al. |
| 8,908,838 B2 | 12/2014 | Engelke et al. |
| 8,917,821 B2 | 12/2014 | Engelke et al. |
| 8,917,822 B2 | 12/2014 | Engelke et al. |
| 8,925,049 B2 | 12/2014 | Morrison et al. |
| 8,938,785 B2 | 1/2015 | Coughlin et al. |
| 9,032,051 B2 | 5/2015 | Low et al. |
| 2007/0016804 A1 | 1/2007 | Kemshall |
| 2007/0206527 A1 | 9/2007 | Lo et al. |
| 2008/0187108 A1 | 8/2008 | Engelke et al. |
| 2008/0206722 A1 | 8/2008 | Fukami |
| 2008/0207169 A1 | 8/2008 | Park et al. |
| 2010/0017847 A1 | 1/2010 | Kawai et al. |
| 2010/0260069 A1 | 10/2010 | Sakamoto et al. |
| 2011/0170672 A1 | 7/2011 | Engelke et al. |
| 2012/0250837 A1 | 10/2012 | Engleke et al. |
| 2013/0067041 A1 | 3/2013 | Low et al. |
| 2014/0286323 A1* | 9/2014 | Hsu ............... H04W 76/021 370/338 |
| 2015/0067726 A1 | 3/2015 | Glasser |
| 2015/0094105 A1 | 4/2015 | Pan |
| 2015/0326610 A1 | 11/2015 | Bartoszewski et al. |
| 2016/0037439 A1 | 2/2016 | Shamis et al. |
| 2016/0100369 A1 | 4/2016 | Chhabra |
| 2016/0242025 A1 | 8/2016 | Aliyar |

* cited by examiner

AUTOMATIC CONNECTION THROUGH A PASSWORD PROTECTED NETWORK CONNECTION

CROSS-REFERENCE TO RELATED APPLICATIONS

This application is a continuation of U.S. patent application Ser. No. 14/819,316, filed on Aug. 5, 2015, the entirety of which is incorporated herein by reference.

FIELD

Embodiments of the disclosure relate to telecommunications. More particularly, the disclosure relates to updating an automatic synchronizing of communication devices with a network device over a password protected network connection to communicate with a communication service for providing assistive services for hearing-impaired users.

BACKGROUND

Communication systems, such as conventional telephone communication systems, provide audio communication between two or more users during a communication session. Communication systems, such as those that are configured to provide assistance to hearing-impaired users, may communicate with external services over an internet connection. For example, audio may be sent over an internet connection during a call to a communication service that generates text captions of the audio signal. The text captions may be sent back to the communication device to supplement with the audio and provide additional understanding to the conversation.

Local area networks (LANs) may be used to enhance the usefulness and flexibility of placement of the communication devices in homes and other locations. In a LAN, a network device (e.g., a router) may provide a wireless connection for the communication device to communicate with another private or public network (e.g., Internet) outside the LAN. Thus, the network device may facilitate communication by routing packets of data between the communication device to and from other devices and services outside the LAN. Typically, setting up a network device includes a standard network name (e.g., SSID) being assigned to the network device for being broadcast to establish a wireless network connection with a communication device, after which the user may change the network name as desired to be more personal to the user. When communication devices in the vicinity of the network device detect wireless connections, the communication devices will list the different SSIDs for the detected networks. The user may select a wireless network connection from the list for the communication device to connect to. The initial network connection for the network device may be publicly accessible until the user sets up a password for connecting through the network. Otherwise, the network connection may remain a public network that does not require a password.

In the case of communication devices that are used by hearing-impaired users, many of these individuals are elderly and not technologically savvy. As a result, a technician may be sent to install the communication device and train the user on its operation. The technician may also assist the user with the connection to the network device and set up the network name, password, and configuration settings for the network device. The provider of such a communication system, may therefore, expend significant resources in the installation of the devices for their customers. In addition, users often forget their password and possibly even the network name. As a result, users may call technical support or require installers to return and assist with connecting devices to their network. This situation may particularly be an issue if the network device and/or communication device is reset, causing its stored configuration settings to be lost.

BRIEF SUMMARY

In some embodiments, the disclosure describes a communication device specifically configured for use by a hearing-impaired user in participating in communication sessions with the assistance of a communication service. The communication device comprises a microphone configured to generate a near-end signal, a speaker configured to produce sound from a far-end signal, communication elements configured to communicate with a network device over a password protected network connection, a memory device, and a processor. The processor is operably coupled with the microphone, the speaker, the communication elements, and the memory device. The processor is configured to automatically connect to the password protected network connection in response to detecting a predetermined network name and using a predetermined password set without input from an end-user of the communication device.

In some embodiments, the disclosure describes a network device, comprising a memory device, communication elements, and a processor operably coupled with the memory device and communication elements. The processor is configured to broadcast a wireless signal through the communication elements for a password protected network connection using a predetermined network name, connect a communication device to the password protected network connection responsive to receiving a password from the communication device that matches a predetermined password stored in the memory device that was not defined by a user of the communication device, and facilitate communication between the communication device and a communication service for hearing-impaired users over the password protected network connection.

In some embodiments, a communication system comprises a communication service configured to provide interpretive services for hearing-impaired users during a communication session, a plurality of network devices at remote locations from the communication service, and a plurality of communication devices at the remote locations from the communication service. Each network device is configured to broadcast a wireless signal for a password protected network connection with a predetermined network name at its respective remote location. Each communication device is specifically configured for use by a hearing-impaired user to connect with the communication service to receive the interpretive services, and further configured to automatically wirelessly connect to the password protected network connection by providing a predetermined password to the network device in response to detecting the predetermined network name.

In some embodiments, a method is described for automatically connecting a communication device with a network device over a password protected network. The method comprises scanning local wireless networks and identifying a local wireless network having a predetermined network name for a password protected network connection, retrieving a predetermined network password that was set without user input, transmitting the predetermined network password to a network device broadcasting the local wireless network having the predetermined network name, and communicating with a communication service through the network device over the password protected network connection providing assistance to interpretive services for a hearing-impaired user during a call.

DETAILED DESCRIPTION

In the following detailed description, reference is made to the accompanying drawings that form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications. Embodiments include features that improve the functionality of the communication device such that new communication device and improved method for performing echo cancellation are described, particularly in a telecommunication system including a communication service for providing text captions to a caption-enabled communication device to assist hearing-impaired users who may use speakers that operate at relatively high volume levels for the hearing-impaired users.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, a "hearing-impaired user" may refer to a person with diminished hearing capabilities. Hearing-impaired users of caption-enabled communication device often have some level of hearing ability that has usually diminished over a period of time such that they can communicate by speaking, but that they often struggle in hearing and/or understanding the far-end user.

The term "call" as used herein refers to the communication session between the hearing-impaired user's communication device and the far-end user's communication device. The call may pass audio signals between the two parties. The term call is used in order to be more easily distinguishable from the captioning communication session. At times, the call may be referred to as incoming or outgoing from the perspective of the hearing-impaired user's communication device. Incoming and outgoing calls may refer to the period of time prior to when the call is "answered" by the other party to begin the communication of the audio signals therebetween.

The term "captioning communication session" as used herein refers to the communication session between the hearing-impaired user's communication device and the communication service. The captioning communication session may pass text captions from the communication service to the hearing-impaired user's communication device. In some embodiments, the captioning communication session may also include the hearing-impaired user's communication device transmitting the far-end user's audio signal to the communication service to generate the text captions.

The term "audio signal" (or voice signal) refers to the signal generated and transmitted by a communication device during a call. Most examples are provided from the perspective of a hearing-impaired user using a captioning communication device, such that the audio signal captured by that device is sometimes referred to as the "near-end audio signal," and the audio signal received to be reproduced by the speaker is sometimes referred to as the "far-end audio signal."

Embodiments of the disclosure span a variety of functions in a variety of applications. Embodiments of the disclosure are described below with reference to communication devices for the hearing impaired. For example, the communication device may include any of a text-captioned communication device, a video communication device, an amplified audio communication device, and combinations thereof that are specifically configured for use by hearing-impaired users.

Figure 1:
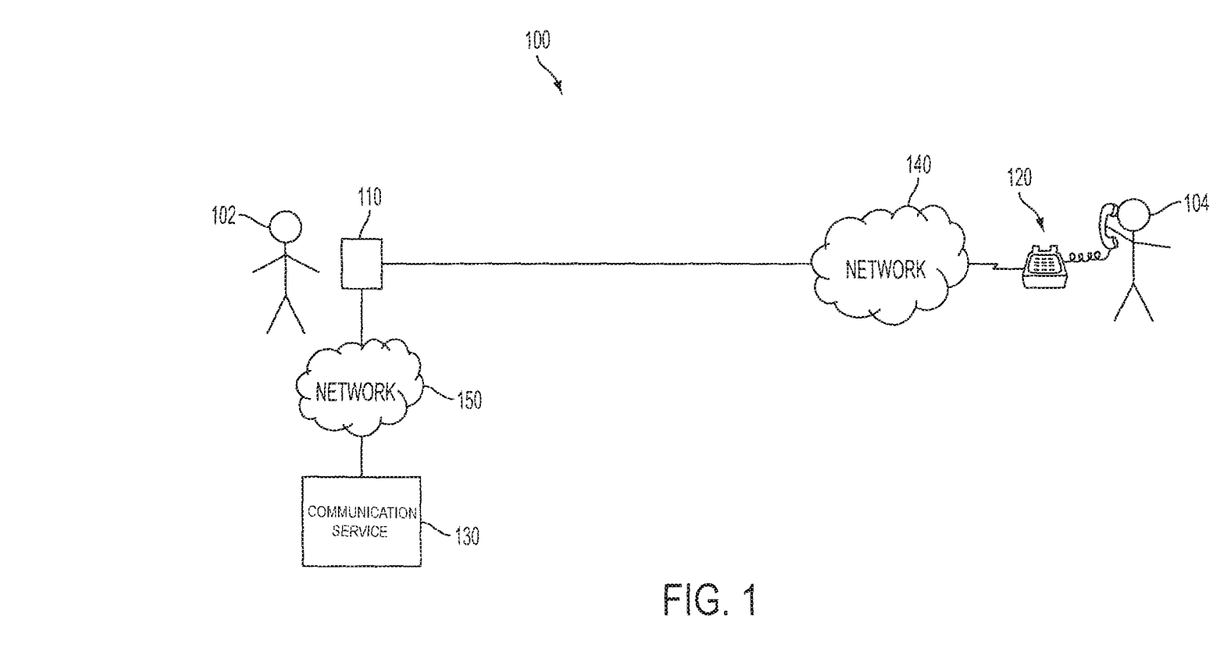
FIG. 1 illustrates a communication system configured to facilitate an assisted call between a hearing-impaired user and a far-end user.

FIG. 1 illustrates a communication system 100 configured to facilitate an assisted call between a hearing-impaired user 102 and a far-end user 104. The communication system 100 may include a first communication device 110, a second communication device 120, and a communication service 130. The first communication device 110 and the second communication device 120 may be coupled together to facilitate communication therebetween via a first network 140. The first communication device 110 and the communication service 130 may be coupled together to facilitate communication therebetween via a second network 150. For example only, the first network 140 and the second network 150 may each be implemented according to the standards and bandwidth requirements of a communication network (e.g., Public Switch Telephone Network (PSTN), cellular network, Voice Over Internet Protocol (VOIP) networks, etc.). The use of the terms "network" or "communication network" as used herein contemplates networks that are compatible and configured to provide communications using analog and/or digital standards unless specifically stated otherwise. In some embodiments, the first network 140 and the second network 150 may be the same network (e.g., both connections may be Internet-based connections). Thus, discussion of the first network 140 and the second network 150 separately may be for convenience of discussing a particular connection between two or more devices. Of course, in some embodiments, the first network 140 and the second network 150 may be different networks. For example, the first communication device 110 and the second communication device 120 may communicate via a PSTN network connection, while the first communication device 110 and the second communication device 120 may communicate via an Internet connection. Other variations and combinations of networks are also contemplated.

The first communication device 110 may include a device that is configured to assist the hearing-impaired user 102 in communicating with another individual (e.g., far-end user 104). In some embodiments, the first communication device 110 may include a caption-enabled communication device configured to receive and display text captions of at least a portion of the conversation. Thus, the hearing-impaired user 102 may be able to read the text captions of the words spoken by the far-end user 104 to supplement the far-end audio signal that is reproduced into sound by the first communication device 110. As a result, the hearing-impaired user 102 may have an improved experience in understanding the conversation. Such an embodiment may be useful for people whose hearing has been damaged or decreased over time (e.g., the elderly); such that they can still speak but have diminished hearing that makes it difficult to communicate. In some embodiments, the first communication device 110 may also be configured to receive and display video on an electronic display on the first communication device 110.

The second communication device 120 may comprise a conventional voice telephone (e.g., landline phone, cellular phone, smart phone, VoIP phone, etc.). As such, the far-end user 104 may interact in a conventional manner with the second communication device 120. In some embodiments, the second communication device 120 may be configured similarly as the first communication device (e.g., caption-enabled communication device). As a result, the second communication device 120 may likewise be operated by a hearing-impaired user. Thus, although facilitating communication between the hearing-impaired user 102 and the far-end user 104 is shown in FIG. 1 to imply that the far-end user 104 is a hearing-capable user, such a situation is shown only as an example. Other embodiments include both the first communication device 110 and the second communication device 120 coupled to the communication service 130 to facilitate the captioning services for each respective hearing-impaired user (not shown). In such a situation, each communication device 110, 120 may have its own communication session with the communication service 130.

The communication service 130 may be configured to provide interpretive services (e.g., captioning) to the hearing-impaired user 102. More specifically, a human "call assistant" within communication service 130 may be employed to facilitate an assisted call between a hearing-impaired user 102 and a far-end user 104. As discussed above, in some embodiments the communication service 130 may be configured to provide text captions of at least a portion of the conversation. In such an embodiment, the call assistant may listen to the voice signal received and re-voice the portion of the conversation into a microphone so that voice recognition software may generate the text captions that are transmitted to the first communication device 110. In some embodiments, the hearing-impaired user may communicate with the communication service 130 to provide video therebetween, such that the interpretive services may include sign language interpretation to facilitate communication between a hearing-impaired user and a hearing-capable user. Thus, the communication service 130 may include one or more of an internet protocol captioned telephone service (IPCTS), captioned telephone service (CTS), video relay service (VRS), or other telecommunications relay services (TRS).

FIG. 1 shows a configuration where the first communication device 110 acts as a router for the voice signal from the second communication device 120 to the communication service 130. In such an embodiment, the voice signal of the far-end user 104 may be transmitted from the second communication device 120 to the first communication device 110. The voice signal of the far-end user 104 may then be transmitted from the first communication device 110 to the communication service 130 for the text captions to be generated in a text captioning embodiment. The text captions may then be transmitted from the communication service 130 to the first communication device 110 to be displayed as text captions for the hearing-impaired user to read during the conversation. The call assistant may also monitor the text captions that are generated and transmitted to the first communication device 110 to identify any errors that may have been generated by the voice recognition software. In some embodiments the communication service 130 may be configured to receive the voice signal from the second communication device 120 and route the voice signal to the first communication device 110. In some embodiments, another device may receive the voice signal from the second communication device 120 and split the voice signal to route to both the first communication device 110 and the communication service 130.

In addition, although FIG. 1 shows only two communication devices 110, 120, the communication system 100 may include more communication devices. It is contemplated that the communication system 100 may facilitate communication between any number and combinations of hearing-impaired users and far-end users. For example, in some embodiments two or more communication devices may be connected for facilitating communication between a hearing-impaired user and other hearing-impaired users and/or far-end users.

Embodiments of the disclosure improve upon conventional communication systems by providing communication devices that are configured to automatically connect with an associated network device over a password protected network connection. As a result, the setup of the password protected network may be simplified as the hearing-impaired user does not need to establish a password. In addition, the hearing-impaired user may not need to remember the password for the password protected network in the event that the network device is reset, which may be particularly useful for hearing-impaired users that are often elderly and have memory problems or struggle using unfamiliar technology.

Figure 2:
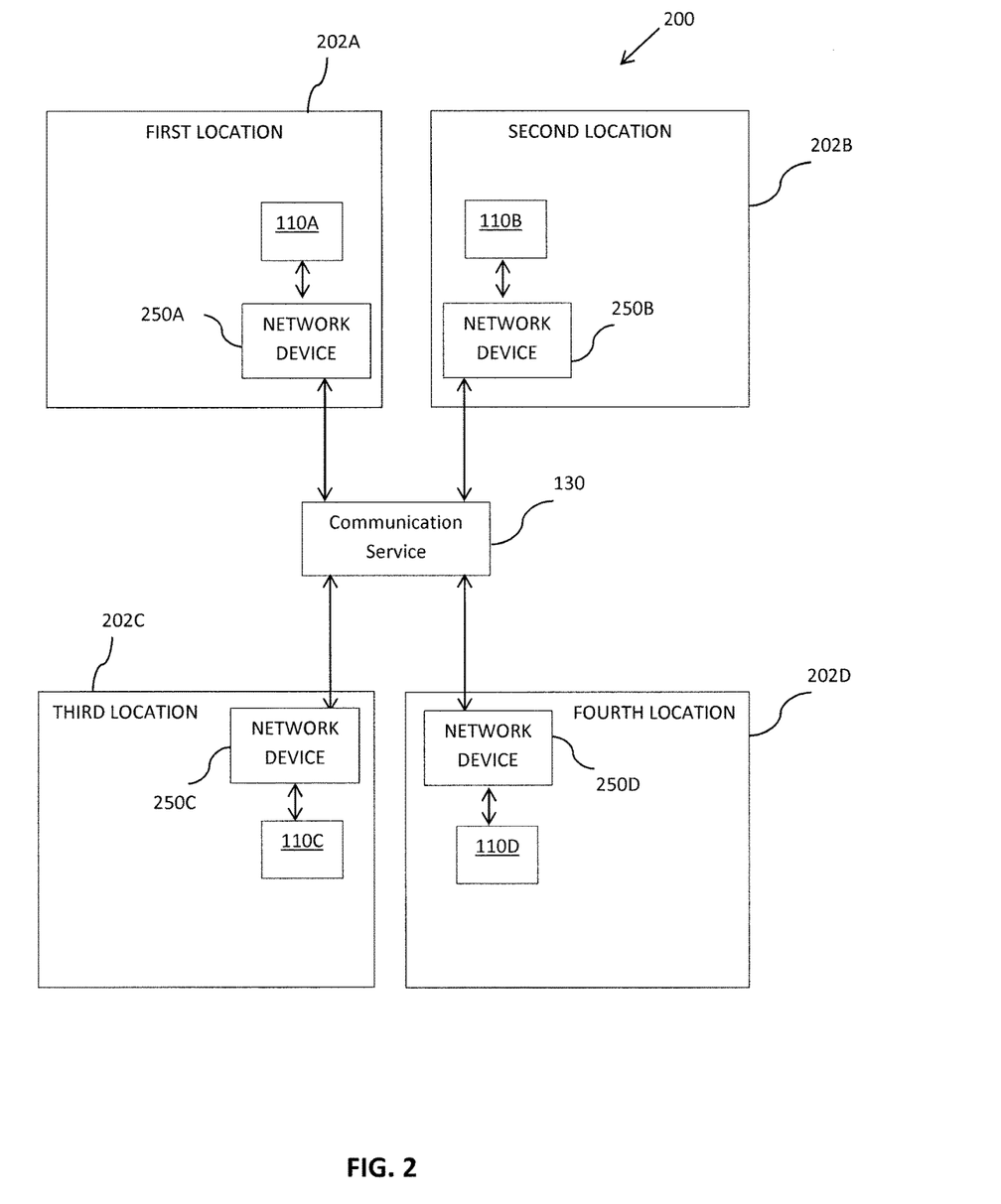
FIG. 2 is a simplified block diagram of a communication system according to an embodiment of the disclosure.

FIG. 2 is a simplified block diagram of a communication system 200 according to an embodiment of the disclosure. The communication system 200 includes a plurality of communication devices 110A-110D that are specifically configured for use by hearing-impaired users to provide assistance for the hearing-impaired user during a communication session with a far-end user. Each communication device 110A-110D may be installed at different locations 102A-102D, such as a home, business, school, or other location where a hearing-impaired user may use the communication device 110A-110D. As discussed above, the communication devices 110A-110D may communicate with the communication service 130 to assist communication (e.g., provide captions, translation, etc.) for the hearing-impaired user. The communication service 130 may include a call center with a plurality of different call assistants to provide these services during calls.

At each location 202A-202D, hearing-impaired users may desire to use the network devices 250A-250D to provide a wireless network connection for the respective communication devices 110A-110D. At times, the network devices 250A-250D may collectively be referred to as "network device 250." Similarly, the communication devices 110A-110D may collectively be referred to as "communication device 110," recognizing that the individual communication device 110A-110D corresponds to an associated network device 250A-250D at a given location 202A-202D. It is recognized that some hearing-impaired users may desire to use a wired connection for connecting the communication device 110 to the Internet; however, the focus of this example involves the communication devices 110A-110D being coupled to a local wireless network (e.g., Wi-Fi).

The network device 250 may include a router, access point, and/or other device that is configured to provide a local wireless network connection for the communication device 110A-110D. For example, the network device 250 may include a wireless network interface coupled to antenna that is configured to convert electrical signals to electromagnetic signals for transmitting data packets, and for receiving data packets from electromagnetic signals converted to electrical signals. The network device 250 may also be configured to provide related services and protocols, such as Dynamic Host Configuration Protocol (DHCP), network address translation (NAT), and the like.

The network device 250 and the communication devices 110 may be configured to automatically connect to each other through a password protected network connection without user input. This automatic connection may occur during the initial setup prior to the end-user establishing any password for the device. For example, the network device 250 may be plugged in to power and to an external network (e.g., Internet), and may broadcast the local wireless signal (e.g., beacon) for a password protected network connection. The local wireless signal may have a predetermined network name (e.g., a predetermined SSID) that may be recognizable to the communication devices 110. Thus, the local wireless signal may represent a virtual access point (VAP) for the network device 250 (i.e., a physical access point) to connect the communication devices 110 to an IP network (e.g., the Internet). In addition, the password protected network connection may have a corresponding predetermined password that is known by the communication devices 110. The predetermined network name and/or predetermined passwords may be saved in, or derived by, the firmware of the network devices 250 and/or communication devices 110 as will be discussed below. The predetermined password may not be changed by the hearing-impaired user or even known by the hearing-impaired user. Instead, the communication devices 110 may automatically provide the predetermined password to connect to the password protected network connection in response to detection thereof. Because the predetermined password is only known by the communication device 110, the hearing-impaired user or any other user may not be able to connect non-authorized devices to the password protected network.

In some embodiments, at least a portion of the predetermined network name may be stored in memory of the network device 250. For example, the predetermined network name may be a common network name across one or more network devices 250 of the communication system 200. For example, the first network device 250A, the second network device 250B, the third network device 250C, and the fourth network device 250D may each have the same predetermined network name (e.g., "CaptionCallNetwork") stored therein for being broadcast. In some embodiments, individual network devices 250 may have their own unique predetermined network names. For example, the first network device 250A may have a first unique predetermined network name (e.g., CaptionCall12345), the second network device 250B may have a second unique predetermined network name (e.g., CaptionCall12346), the third network device 250C may have a third unique predetermined network name (e.g., CaptionCall12347), and the fourth network device 250D may have a fourth unique predetermined network name (e.g., CaptionCall12348). At least a portion of each predetermined network name (e.g., CaptionCall) may be common across each network device 250 for the communication devices to detect. Another portion (e.g., 12345, 12346, etc.) may be unique across each network device 250 to uniquely identify each network name. The unique portion of the predetermined network name may correspond to a serial number for the network device 250, a MAC address for the network device 250, or some other number (including a randomly assigned or an arbitrary identifier). Of course, the predetermined network name may be any combination of letters, numbers, or other characters as desired, and the specific examples provided herein are not intended to limit the format to require a particular word or phrase. Thus, the predetermined network name may be in the format of XY, where X is a common portion and Y is a unique portion across the different network devices 250. Thus, each network device 250 may have its own predefined unique network name (e.g., SSID).

In some embodiments, the full predetermined network name may be stored in memory of the network device 250. In other embodiments, the common portion of the network name may be stored in one portion of memory, and the unique portion of the network name may be retrieved elsewhere (e.g., stored in memory, retrieved from an external server, etc.). In some embodiments, the network device 250 may connect to an external network and automatically request the predetermined network name from an external server associated with the communication service 130.

The communication device 110 may detect one or more local wireless signals including the local wireless signal broadcast by the network device 250. For example, the communication device 110 may be configured to recognize the predetermined network name (e.g., at least based on the common portion), and transmit a predetermined password to connect to the password protected network connection of the network device 250. The predetermined password may be stored in memory (e.g., in firmware) of the communication devices 110. In some embodiments, the predetermined password may also be the same password that is stored in memory across all communication devices 110 of the communication system 200. For example, the first network device 250A, the second network device 250B, the third network device 250C, and the fourth network device 250D may each have the same predetermined password (e.g., "CaptionPassword") stored therein for being transmitted to the network device 250 detecting one of the predetermined network name (which may or may not be unique across all network devices of the communication system).

In some embodiments, individual network devices 250 may have their own unique predetermined passwords. For example, the first network device 250A may have a first unique predetermined password (e.g., CaptionPassword1), the second network device 250B may have a second unique predetermined password (e.g., CaptionPassword2), the third network device 250C may have a third unique predetermined password (e.g., CaptionPassword3), and the fourth network device 250D may have a fourth unique predetermined password (e.g., CaptionPassword4). At least a portion of each predetermined password (e.g., Caption) may be common across each network device 250 for the communication devices to detect. Another portion (e.g., 1, 2, etc.) may be unique across each network device 250. Of course, the predetermined network name may be any combination of letters, numbers, or other characters as desired, and the specific examples provided herein are not intended to limit the format to require a particular word or phrase. Such a password may be a completely arbitrary combination of letters (e.g., case sensitive), numbers, and/or characters (e.g., "6xP3 mW$2!bhR") so as to provide a sufficient level of security to ensure that only authorized communication devices 110 may join the wireless network.

As discussed above, the predetermined password may be the same across all network devices 250 such that each communication device 110A-110D of the communication system uses the same predetermined password. In some embodiments, some communication devices 110 may have different passwords. For example, the predetermined password may be in the format of AB, where A is a common portion and B is a unique portion across the different network devices 250. In some embodiments, the full predetermined password may be stored in memory of the communication device 110. In other embodiments, the common portion of the predetermined password may be stored in one portion of memory, and the unique portion of the predetermined password may be derived, such as from the predetermined network name detected by firmware of the communication device 110.

In some embodiments, the firmware of the communication device 110 may be programmed such that no portion of the password is stored therein. Rather, the communication device 110 may derive the entire password based on instructions (e.g., using a cipher) stored in memory device 440. For example, the predetermined password may be derived from the predetermined network name. In other words, the predetermined password may be based on a translated form of the predetermined network name. Thus, if the predetermined network name is changed for the network device 250, the network device 250 may also update the predetermined password based on a set of translation rules that are also known by the communication device 110. As a result, such an embodiment may permit the communication service 130 to change network names and/or passwords via a firmware update to the network devices 250 without necessarily needing a firmware update to the communication devices 110.

As discussed above, the inventor has appreciated that such an arrangement may be particularly beneficial for communication systems for individuals who are hard of hearing who use devices that are part of a closed communication system 200 run by a single administrator. In other words, the communication system 200 may have a single administrator that controls (e.g., issues, manufactures, installs, supports, etc.) both the network devices and the communication devices. Such individuals are also often elderly individuals who may not be technologically savvy or may have difficult remembering passwords. In the network device 250 has issues that requires a hard reset, the network device 250 and the communication device 110 may again synchronize through a password protected wireless network without the user needing to enter a password. In addition, a technician may not need to be deployed to assist the hearing-impaired to manually re-enter a password. Other communication systems in which a single administrator may offer both a communication device and a network device may also benefit from such a system as well. Although the user may not be permitted to change the predetermined password, the administrator of the communication service 130 may desire to change the predetermined password. For example, the predetermined password may become publicly known to necessitate a change or the predetermined password may be periodically changed to improve security measures. As a result, the communication service 130 may issue a firmware update to the network devices 250 and/or communication devices 110 as will also be discussed further below.

In some embodiments, the network device 250 may be configured to broadcast a plurality of local wireless signals (e.g., beacons) that each represent a different VAP that may all connect to the same IP network through the network device 250 (i.e., a physical access point). Each local wireless signal may have its own network name—one of which may be the predetermined network name discussed above. The other network names supported by the network device 250 may include at least one user-defined network name that may permit other devices (e.g., a laptop, desktop computer, tablet computer, smartphone, etc.) that are unassociated with the communication service 130 to connect to the external network through the same network device 230. As a result, the communication (e.g., far-end audio, captions, video, etc.) between the communication device 110 and the communication service 130 may be routed through a dedicated password protected VAP defined by the predetermined network name. Other unrelated network traffic to other devices may be routed through different VAPs that may have different security settings (e.g., different password, no password, different filters, etc.).

When the network device 250 is connected to the external network, the network device 250 may automatically receive an IP address from an upstream router. If the network device 250 does not receive an IP address or if the IP address is not valid, the network device may generate an indicator (e.g., flashing light, sound, etc.) to inform the installer that the network device 250 cannot access the external network. Once the network device 250 is connected to the communication device through the first network connection as well as to the external network, the network device 250 may route data between the communication device and the communication service for generating the captions during the call.

Figure 3:
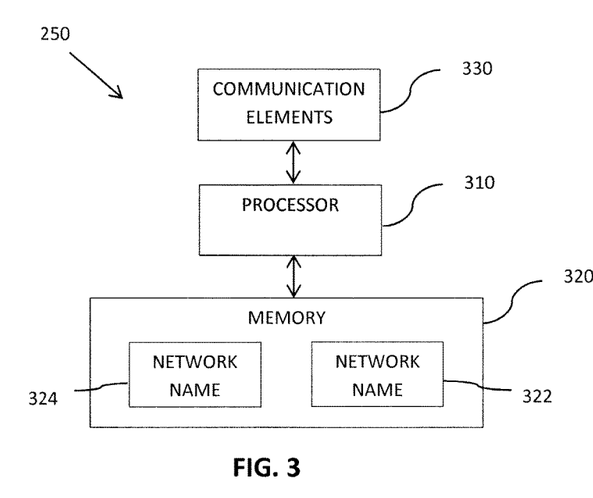
FIG. 3 is a simplified schematic block diagram of a network device according to an embodiment of the disclosure.

FIG. 3 is a simplified schematic block diagram of a network device 250 according to an embodiment of the disclosure. The network device 250 includes a processor 310 operably coupled with memory 320 and communication elements 330. The network device 250 may be configured as discussed above with respect to FIG. 2.

The communication elements 330 may include components configured to transmit/receive wireless communication over a local wireless network (e.g., Wi-Fi) as well as over a wired connection (e.g., Ethernet) to an external network (e.g., an IP network). As an example, the communication elements 330 may include a combination of components such as antennas, interfaces, receivers, transmitters, transceivers, etc. The communication elements 330 may communicate with the communication service 130 for providing assistance during a communication session with the far-end user 104.

The memory 320 may include non-volatile memory and/or volatile memory. By way of example and not limitation, the memory device 240 may include Synchronous Random Access Memory (SRAM), Dynamic RAM (DRAM), Read-Only Memory (ROM), Flash memory, and the like. Non-volatile memory may include firmware and other long term memory for storing persistent programs, program state and configuration information, etc.

The memory 320 may store at least one network name of a first network name 322 and a second network name 324 (e.g., one or more SSIDs), at least one of which may be the predetermined network name discussed above. For example, the first network name 322 may be the predetermined network name, which may be preloaded into memory 320 during manufacturing, during testing, or at some other time (e.g., received from an external server associated with the communication service 130). Thus, the first network name 322 may be an SSID for a password protected network connection (e.g., VAP) that has a predetermined password that is automatically provided by the communication device 110 without the user's input of the password. The predetermined password may also be stored in memory 320. The first predetermined network name 322 and the associated predetermined password may be stored in the firmware during manufacturing such that they are preexisting prior to being received by the end-user. The end-user may not update either of the first predetermined network name 322 or the associated predetermined password. In some embodiments, a firmware update from the administrator of the communication system may provide an update to either the first predetermined network name 322 and/or the associated password. Likewise, the communication device (FIG. 4) may be configured to identify the first predetermined network name 322 and retrieve its associated predetermined password to transmit to the network device 250 for authentication as will be discussed below.

In operation, the network device 250 may broadcast the wireless signal (e.g., Wi-Fi) for the different network names 322, 324 and await connection from devices. For password protected networks, the network device 250 may authenticate devices for establishing a connection by comparing a password received from the communication device with the predetermined password. If there is a match, the communication device may be permitted to connect to the wireless network connection for communication with the communication service 130. The password protected network connection associated with the predetermined password may be used specifically for traffic with the communication service 130 (FIG. 1). The second network name 324 may be another SSID for another network connection (e.g., VAP). This SSID and password (if any) may be selected and editable by the user. Additional network connections may be used for other types of traffic, such as for non-authorized devices that do not communicate with the communication service 130. When both network connections are busy, the first network name 322 associated with the captioning connection with the communication service 130 may have higher priority for transmitting and receiving data.

As the first predetermined network and its associated predetermined password may be stored in firmware and not editable by the end-user, this information may be persistent within the network device 250 with the initial set up for the end-user as well as after a hard reset occurs in which other configuration settings set by the user may be erased. Other network names and passwords may be erased in such a situation even if the first predetermined network name and password are not erased.

Figure 4:
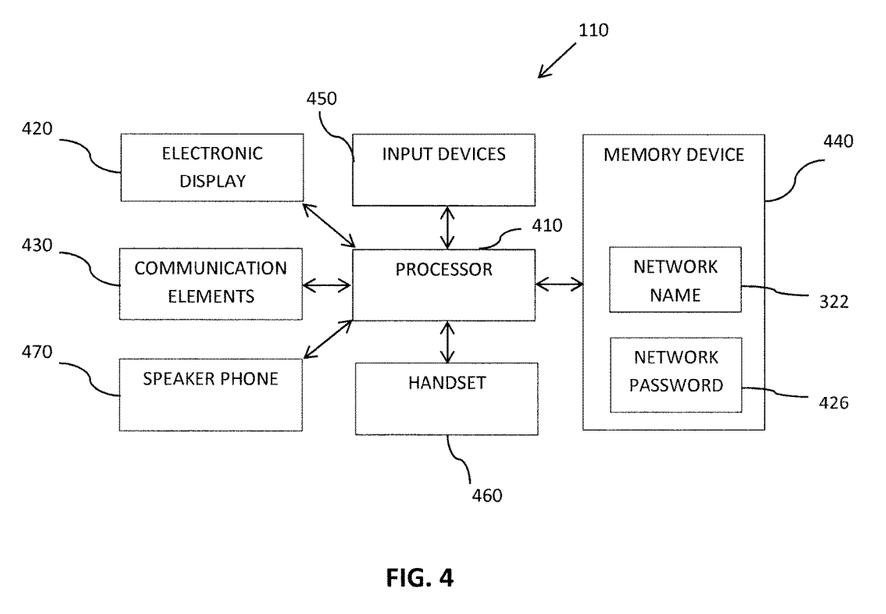
FIG. 4 is a simplified schematic block diagram of a communication device specifically configured for use by a hearing-impaired user according to an embodiment of the disclosure.

FIG. 4 is a simplified schematic block diagram of a communication device 110 specifically configured for use by a hearing-impaired user according to an embodiment of the disclosure. For example, the communication device 110 may be configured to establish calls with other communication devices as well as the communication service 130 (FIG. 1) configured to assist the hearing-impaired user. The communication device 110 may be a caption enabled communication device, which may be implemented as a standalone device (e.g., a caption phone), or as implemented on another device (e.g., tablet computer, laptop computer, smart phone, etc.).

The communication device 110 may include a processor 410 operably coupled with an electronic display 420, communication elements 430, a memory device 440, and input devices 450. In some embodiments, the communication device 110 may include a camera for also participating in a video communication session. The processor 410 may coordinate the communication between the various devices as well as execute instructions stored in computer-readable media of the memory device 440. The processor 410 may be configured to execute a wide variety of operating systems and applications including the computing instructions.

The memory device 440 may be used to store computing instructions, data, and other information for performing a wide variety of tasks including performing embodiments disclosed herein. By way of example and not limitation, the memory device 440 may include Synchronous Random Access Memory (SRAM), Dynamic RAM (DRAM), Read-Only Memory (ROM), Flash memory, and the like. The memory device 440 may include volatile and non-volatile memory storage for the communication device 110. In some embodiments, the memory device 440 may also include at least a portion of the predetermined network name 322 stored thereon. In some embodiments, the memory device 440 may also have at least a portion of the predetermined network password 426 stored thereon. In some embodiments, the memory device 440 may include instructions for the processor 410 to automatically derive the predetermined password (e.g., using the predetermined network name broadcast by the network device).

The communication elements 430 may be configured to communicate with other devices or communication networks, including other communication devices and the communication service. As non-limiting examples, the communication elements 430 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, and other suitable communication interfaces and protocols. The input devices 450 may include a numeric keypad, a keyboard, a touchscreen, a remote control, a mouse, buttons, other input devices, or combinations thereof.

The communication device 110 may further include a plurality of different components through which the user may communicate. In particular, the communication device 110 may include a handset 460 and a speakerphone 470. The handset 460 may be a handheld device having a microphone for the hearing-impaired user to speak into and capture the near end audio to transmit to the far-end communication device, as well as a speaker for the hearing-impaired user to hear the far-end audio produced by the speaker. The handset 460 may be coupled to the base unit of the communication device 110 through a cord or as a cordless handset. The speakerphone 470 may include a microphone and a speaker that are integrated into the base unit of the communication device 110. In some embodiments, the communication device 110 may also be compatible to communicate with a headset (not shown) having its own speaker and microphone. The headset is typically worn by the hearing-impaired user to position the speaker close to the hearing-impaired user's ear and the microphone close to the hearing-impaired user's mouth. The headset may be coupled to the base unit through a cord or as a cordless headset (e.g., via Bluetooth connection). In some embodiments, the headset may not include its own microphone. In such embodiments, the microphone of the speakerphone may be used.

In operation, the communication device 110 may detect the wireless signals broadcast by the network device and other network devices in the vicinity. The processor 410 may identify the predetermined network name 322 and transmit the predetermined network password 426 for authentication by the network device. Once the access to the predetermined network connection is permitted, the processor 410 (through the communication elements 430) may be able to communicate with the communication service 130 (FIG. 1) through the network device. For example, the far-end audio received by the communication device 110 may be transmitted to the network device over the password protected network connection and further to the communication service 130. The text captions from the communication service 130 may be received from the communication service 130 over the password protected network connection through the network device.

As at least portions of the first predetermined network and/or its associated predetermined password may be stored in firmware of the communication device 110 and not editable by the end-user, this information may be persistent within the communication device 110 with the initial set up for the end-user as well as after a reset of data occurs in which other configuration settings set by the user may be erased. Other network names and passwords may be erased in such a situation even if the first predetermined network name and password are not erased.

Figure 5:
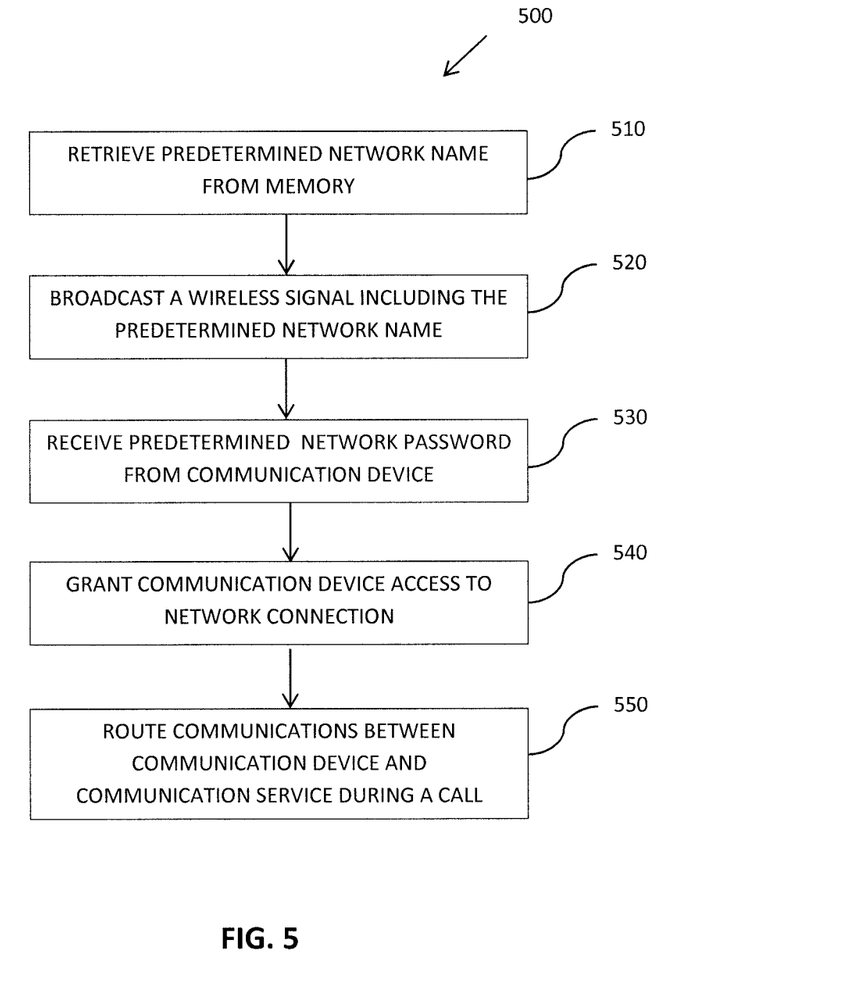
FIG. 5 is a flowchart illustrating a method of operating a network device according to an embodiment of the disclosure.

FIG. 5 is a flowchart 500 illustrating a method of operating a network device according to an embodiment of the disclosure. As discussed above, the network device may provide a password protected wireless network connection (e.g., VAP) for a communication device to communicate with a communication service that provides services for hearing-impaired users during a communication session.

At operation 510, the network device may retrieve the predetermined network name, such as using the processor retrieving a stored predetermined network name from memory to use for the password protected wireless network connection. As discussed above, the predetermined network name may be an SSID that may be unique to the network device. For example, the predetermined network name may include a common portion that is common across a plurality of different network devices of the communication system, and a unique portion that is unique to the individual network device. Its associated password may be a predetermined password that is persistent within the network device without being editable by the end-user.

At operation 520, the network device may broadcast a wireless signal including the predetermined network name through the communication elements of the network device. The password protected network connection associated with the predetermined network name may be used by authorized communication devices to communicate with the communication service during a communication session with a far-end user, such as to transmit the far-end audio signal and/or receive text captions from the communication service. In some embodiments the network device may support additional network connections (e.g., VAPs) that may or may not be password protected. The additional network connections may be used by other devices for purposes other than the network traffic with the communication service.

At operation 530, the network device may receive the predetermined network password from the communication device through its communication elements. At operation 540, the network device through its processor may authenticate the communication device if the password received is a match with the predetermined network password. As a result, the communication device may be granted access to the password protected network connection. At operation 550, the network device may route communications between the communication device and a communication service during a call. For example, far-end audio may be passed over the password protected network connection to the network device for further transmission to the communication service. Text captions received from the communication service may also be transmitted over the password protected network connection from the network device to the communication device.

Figure 6:
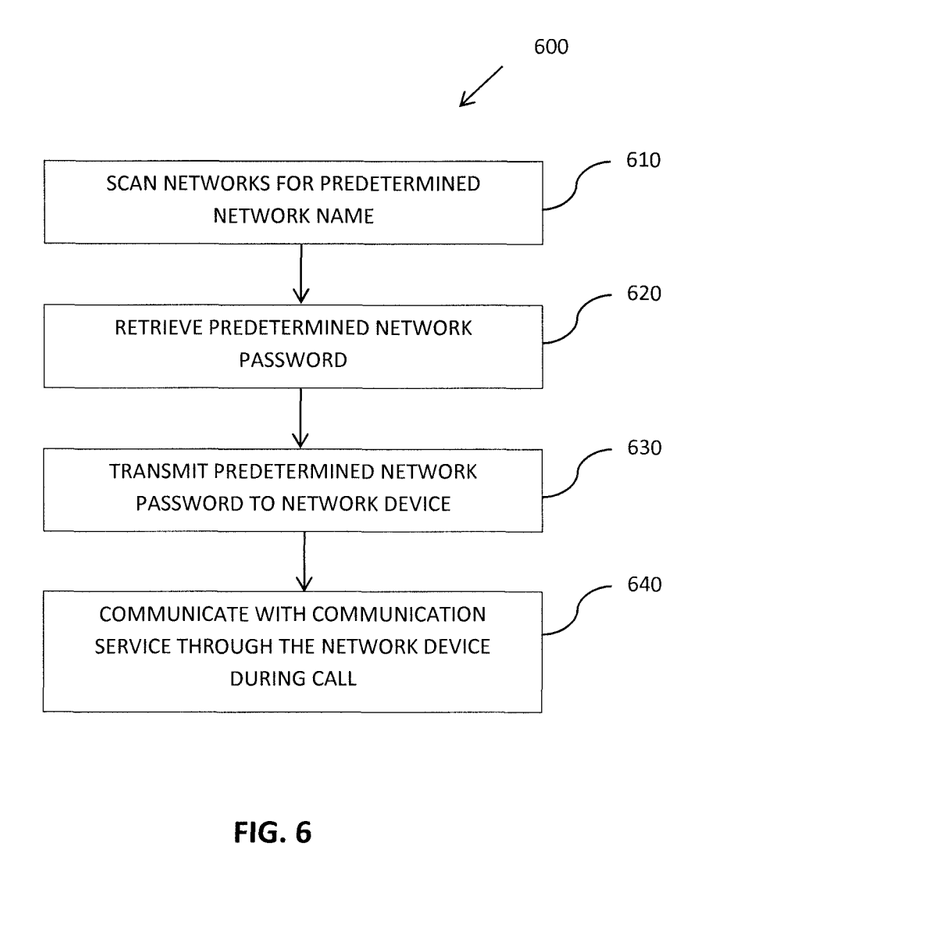
FIG. 6 is a flowchart illustrating a method of operating a communication device specifically configured for use by a hearing-impaired user according to an embodiment of the disclosure.

FIG. 6 is a flowchart 600 illustrating a method of operating a communication device specifically configured for use by a hearing-impaired user according to an embodiment of the disclosure. As discussed above, the communication device may be configured to automatically connect to a password protected wireless network connection (e.g., VAP) broadcast by a network device to communicate with a communication service that provides services for hearing-impaired users during a communication session.

At operation 610, the communication device may scan networks for identifying the password protected network connection having the predetermined network name. While other wireless signals may be sensed, the wireless signal associated with the predetermined network name may be detected based on at least a portion thereof being stored in memory device of the communication device.

At operation 620, the communication device may retrieve the predetermined network password. In some embodiments, at least a portion of the predetermined network password may be stored in the memory device of the communication device. In some embodiments, at least a portion of the predetermined network password may be derived using instructions stored in the memory device of the communication device.

At operation 630, the communication device may transmit the predetermined network password to the network device for authentication and to enable access to the password protected network connection.

At operation 640, the communication device may communicate with the communication service through the network device during the call. For example, the far-end audio may be transmitted to the network device over the password protected network connection for further transmission to the communication service. The communication device may receive the returning text captions (originating from the network device) over the password protected network connection through the network device.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventor.

What is claimed is:

1. A communication device comprising:
   communication elements configured to communicate with a network device over a local password-protected wireless network;
   memory configured to store instructions; and
   a processor operably coupled to the communication elements and the memory, wherein the processor is configured to execute the instructions to cause the communication device to perform operations, the operations comprising:
      obtain a particular password known to the network device and the communication device and unknown by an end-user of the communication device;
      obtain a particular service set identifier (SSID) known to the network device and unknown by an end-user of the communication device, the particular SSID not being obtained from the network device over the local password-protected wireless network and corresponding to the local password-protected wireless network and the particular password corresponding to the particular SSID such that the particular password is used to access to the local password-protected wireless network;
      after obtaining the particular SSID, monitor service set identifiers obtained by the communication elements to detect the particular SSID broadcast by the network device that corresponds to the local password-protected wireless network; and
      in response to detection of the particular SSID, automatically transmit the particular password to the network device to obtain access to the local password-protected wireless network.

2. The communication device of claim 1, wherein obtaining the particular password includes deriving the particular password from the particular SSID.

3. The communication device of claim 2, wherein deriving the particular password from the particular SSID includes apply a cipher to the particular SSID to derive the particular password.

4. The communication device of claim 1, wherein the particular password is transmitted to the network device prior to an initial attempt at connecting the communication device to the local password-protected wireless network being initiated by an end-user of the communication device.

5. The communication device of claim 1, wherein the operations further comprise after obtaining access to the local password-protected wireless network, communicate with a remote communication service through the network device.

6. The communication device of claim 5, wherein the communications with the remote communication service through the network device include:
   providing audio to the remote communication service from the communication device over the local password-protected wireless network; and
   receiving text captions from the remote communication service over the local password-protected wireless network, the text captions based on the audio.

7. The communication device of claim 1, wherein the particular SSID is a portion of an entire SSID broadcast by the network device.

8. The communication device of claim 7, wherein obtaining the particular password includes deriving the particular password from the entire SSID broadcast by the network device.

9. The communication device of claim 1, wherein the processor is configured to not permit the particular password for the local password-protected wireless network to be changed by the end-user.

10. A network device, comprising:
    memory configured to store instructions, a particular service set identifier (SSID), and a particular password;

communication elements configured to wirelessly communicate with a communication device over a local password-protected wireless network generated by the network device; and a processor operably coupled with the memory and the communication elements, wherein the processor is configured to execute the instructions to cause the network device to perform operations, the operations comprising:

broadcast the particular SSID, the particular SSID corresponding to the local password-protected wireless network and the particular password corresponding to the particular SSID such that the particular password is used by the communication device to access the local password-protected wireless network;

receive the particular password from the communication device with a request to connect to the local password-protected wireless network, the particular password being unknown to an end-user of the communication device;

connect the communication device to the local password-protected wireless network;

establish a second local wireless network that represents a different virtual access point that includes a second SSID; and provide higher priority to network traffic to a remote communication service over the local password-protected wireless network and lower priority to network traffic over the second local wireless network when both are in use at the same time.

11. The network device of claim 10, wherein the operations further comprise facilitate communication between the communication device and the remote communication service to receive text captions from the remote communication service and to transmit the text captions to the communication device over the local password-protected wireless network for display by the communication device to the end-user.

12. The network device of claim 11, wherein the network device is configured to set the particular password for the local password-protected wireless network to not be editable by the end-user, and to set another password for the second local wireless network to be editable by the end-user.

13. The network device of claim 10, wherein the second local wireless network is used to permit other communication devices to access network traffic unrelated to the remote communication service.

14. A method to connect a communication device with a network device over a local password-protected wireless network, the method comprising:

presenting service set identifiers obtained by the communication device;

obtaining selection of a service set identifier (SSID) broadcast by the network device, the SSID corresponding to the local password-protected wireless network;

in response to the selection of the SSID, automatically deriving, by the communication device, a single particular password to obtain access to the local password-protected wireless network, the single particular password derived by the communication device by applying a function to the SSID;

in response to derivation of the single particular password, automatically transmitting the single particular password to the network device to obtain access to the local password-protected wireless network; and obtaining, at the network device, a second password for a second local wireless network, wherein the single particular password for the local password-protected wireless network is not editable by an end-user of the communication device and the second password for the second local wireless network is editable by the end-user.

15. The method of claim 14, wherein the function includes a cipher or a translation.

16. The method of claim 14, further comprising after obtaining access to the local password-protected wireless network, communicating with a remote communication service through the network device.

17. The method of claim 16, wherein communicating with the remote communication service through the network device includes:

providing audio to the remote communication service from the communication device over the local password-protected wireless network; and receiving text captions from the remote communication service over the local password-protected wireless network, the text captions based on the audio.

18. One or more non-transitory computer-readable media configured to store instructions that when executed by one or more processors cause a system to perform the method of claim 14.

* * * * *